(12) United States Patent
Naserian et al.

(10) Patent No.: US 11,491,985 B2
(45) Date of Patent: Nov. 8, 2022

(54) PROCESS AND SYSTEM FOR SENSOR SHARING FOR AN AUTONOMOUS LANE CHANGE

(71) Applicant: GM GLOBAL TECHNOLOGY OPERATIONS LLC, Detroit, MI (US)

(72) Inventors: Mohammad Naserian, Windsor (CA); Curtis L. Hay, West Bloomfield, MI (US); Sayyed Rouhollah Jafari Tafti, Troy, MI (US); Allan K. Lewis, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 16/695,897

(22) Filed: Nov. 26, 2019

(65) Prior Publication Data

US 2021/0155245 A1    May 27, 2021

(51) Int. Cl.
*B60W 30/18* (2012.01)
*B60W 40/12* (2012.01)
*H04W 4/46* (2018.01)

(52) U.S. Cl.
CPC ...... *B60W 30/18163* (2013.01); *B60W 40/12* (2013.01); *H04W 4/46* (2018.02); *B60W 2554/80* (2020.02); *B60W 2556/45* (2020.02); *B60W 2556/65* (2020.02)

(58) Field of Classification Search
CPC .......... B60W 30/18163; B60W 40/12; B60W 2556/45; B60W 2554/80; B60W 2556/65; H04W 4/46
See application file for complete search history.

(56) References Cited

U.S. PATENT DOCUMENTS

| 2013/0245877 | A1* | 9/2013 | Ferguson | G05D 1/0214 |
| | | | | 701/23 |
| 2016/0274228 | A1* | 9/2016 | Cashler | G01S 13/872 |
| 2018/0067496 | A1* | 3/2018 | Prasad | G01S 15/931 |
| 2018/0079420 | A1* | 3/2018 | Aine | B60W 30/16 |
| 2018/0268703 | A1* | 9/2018 | Kang | G08G 1/166 |
| 2020/0108869 | A1* | 4/2020 | You | G07C 5/0866 |
| 2020/0186290 | A1* | 6/2020 | Zhang | H04W 76/14 |
| 2020/0367096 | A1* | 11/2020 | Hwang | H04W 4/40 |
| 2021/0009133 | A1* | 1/2021 | Mcnew | B60W 40/09 |

FOREIGN PATENT DOCUMENTS

WO    WO-2021053474 A1 *   3/2021

* cited by examiner

*Primary Examiner* — Behrang Badii
*Assistant Examiner* — Jay Khandpur
(74) *Attorney, Agent, or Firm* — Quinn IP Law

(57) ABSTRACT

A process for sensor sharing for an autonomous lane change is provided. The process includes, within a dynamic controller of a host vehicle, monitoring sensors of the host vehicle, establishing communication between the host vehicle and a confederate vehicle on a same roadway as the host vehicle, monitoring sensors of the confederate vehicle, within the dynamic controller of the host vehicle, utilizing data from the sensors of the host vehicle and data from the sensors of the confederate vehicle to initiate a lane change maneuver for the host vehicle, and executing the lane change maneuver for the host vehicle.

18 Claims, 14 Drawing Sheets

PROCESS AND SYSTEM FOR SENSOR SHARING FOR AN AUTONOMOUS LANE CHANGE

INTRODUCTION

The disclosure generally relates to a process and system for sensor sharing for an autonomous lane change.

Autonomous lane changing is a control process whereby a computerized processor autonomously or semi-autonomously controls operation of a vehicle. Sensor data is useful to provide information to the autonomous lane changing control process. Sensor data may come from a wide variety of sensors, including but not limited to a camera, a radar device, a LIDAR device, and an ultrasonic sensor device. Control processes implemented by autonomous lane changing may include but are not limited to lane keeping, adaptive cruise control, obstacle avoidance, and automatic lane changing.

One vehicle may share data with another vehicle. According to one exemplary embodiment, vehicle to vehicle communication is possible, with maximum vehicle to vehicle communication ranges varying upon particular hardware configurations. According to another exemplary embodiment, communication through dedicated short-range communications (DSRC) is possible, for example, with one vehicle providing information wirelessly to a second vehicle through a dedicated roadside unit providing a secure wireless connection similar to WiFi. According to another exemplary embodiment, communication through a wireless cloud network is possible, for example, with one vehicle providing information wirelessly to a remote server device and with a second vehicle accessing the data wirelessly from the remote server device.

SUMMARY

A process for sensor sharing for an autonomous lane change is provided. The process includes, within a dynamic controller of a host vehicle, monitoring sensors of the host vehicle, establishing communication between the host vehicle and a confederate vehicle on a same roadway as the host vehicle, monitoring sensors of the confederate vehicle, within the dynamic controller of the host vehicle, utilizing data from the sensors of the host vehicle and data from the sensors of the confederate vehicle to initiate a lane change maneuver for the host vehicle, and executing the lane change maneuver for the host vehicle.

In some embodiments, establishing the communication between the host vehicle and the confederate vehicle includes establishing direct vehicle to vehicle communication.

In some embodiments, establishing the communication between the host vehicle and the confederate vehicle includes communicating through a wireless network.

In some embodiments, utilizing the data from the sensors of the host vehicle and the data from the sensors of the confederate vehicle to initiate the lane change maneuver for the host vehicle includes selecting a calculated perception range to initiate the lane change maneuver and determining whether an effective sensor range of the sensors of the host vehicle and an effective sensor range of the sensors of the confederate vehicle together cover the calculated perception range.

In some embodiments, determining whether the effective sensor range of the sensors of the host vehicle and the effective sensor range of the sensors of the confederate vehicle together cover the calculated perception range includes determining an effect of a third vehicle obscuring the sensors of the host vehicle.

In some embodiments, determining whether the effective sensor range of the sensors of the host vehicle and the effective sensor range of the sensors of the confederate vehicle together cover the calculated perception range further includes determining an effect of the third vehicle obscuring the sensors of the confederate vehicle.

In some embodiments, determining whether the effective sensor range of the sensors of the host vehicle and the effective sensor range of the sensors of the confederate vehicle together cover the calculated perception range includes determining an effect of a trailer being towed by the host vehicle obscuring the sensors of the host vehicle.

In some embodiments, selecting the calculated perception range to initiate the lane change maneuver includes determining a time to achieve a target speed at a completion of the lane change maneuver.

In some embodiments, selecting the calculated perception range includes adding an offset value.

In some embodiments, utilizing the data from the sensors of the host vehicle and the data from the sensors of the confederate vehicle to initiate the lane change maneuver for the host vehicle includes comparing an absolute value of an initial speed of the host vehicle minus a determination lane speed limit plus an offset value to a calibration value and declining to initiate the lane change maneuver based upon the comparing.

In some embodiments, the host vehicle is initially traveling in a first lane upon the roadway, and executing the lane change maneuver for the host vehicle includes moving the host vehicle into a second lane upon the roadway.

In some embodiments, monitoring the sensors of the host vehicle includes detecting an oversized vehicle upon the roadway, the host vehicle is initially traveling in a first lane upon the roadway, and executing the lane change maneuver for the host vehicle includes moving the host vehicle to one side of the first lane based upon maintaining an offset from the oversized vehicle.

In some embodiments, the process further includes determining an effect of a trailer being towed by the host vehicle obscuring the sensors of the host vehicle.

In some embodiments, the confederate vehicle is rearward of the host vehicle.

In some embodiments, the confederate vehicle is forward of the host vehicle.

According to one alternative embodiment, a process for sensor sharing for an autonomous lane change is provided. The process includes, within a dynamic controller of a host vehicle, monitoring sensors of the host vehicle, establishing communication between the host vehicle and a confederate vehicle on a same roadway as the host vehicle through a wireless network, monitoring sensors of the confederate vehicle, within the dynamic controller of the host vehicle, utilizing data from the sensors of the host vehicle and data from the sensors of the confederate vehicle to initiate a lane change maneuver for the host vehicle. The utilizing includes selecting a calculated perception range to initiate the lane change maneuver and determining whether an effective sensor range of the sensors of the host vehicle and an effective sensor range of the sensors of the confederate vehicle together cover the calculated perception range. The process further includes executing the lane change maneuver for the host vehicle.

In some embodiments, determining whether the effective sensor range of the sensors of the host vehicle and the effective sensor range of the sensors of the confederate vehicle together cover the calculated perception range includes determining an effect of a third vehicle obscuring the sensors of the host vehicle.

According to one alternative embodiment, a system for sensor sharing for an autonomous lane change is provided. The system includes a host vehicle traveling upon a roadway and including a first sensor configured to monitor the roadway, a confederate vehicle traveling upon the roadway including a second sensor configured to monitor the roadway, a communication link between the host vehicle and the confederate vehicle, and a computerized dynamic controller within the host vehicle. The computerized dynamic controller is programmed to monitor data from the first sensor, monitor data from the second sensor through the communication link, utilize the data from the first sensor and the data from the second sensor to initiate a lane change maneuver for the host vehicle, and authorizing the lane change maneuver for the host vehicle.

In some embodiments, the host vehicle includes a towed trailer, and the computerized dynamic controller evaluates an effect of the towed trailer upon the data from the first sensor.

In some embodiments, utilizing the data from the first sensor and the data from the second sensor to initiate the lane change maneuver for the host vehicle includes selecting a calculated perception range to initiate the lane change maneuver and determining whether an effective sensor range of the sensors of the host vehicle and an effective sensor range of the sensors of the confederate vehicle together cover the calculated perception range.

The above features and advantages and other features and advantages of the present disclosure are readily apparent from the following detailed description of the best modes for carrying out the disclosure when taken in connection with the accompanying drawings.

DETAILED DESCRIPTION

Figure 1:
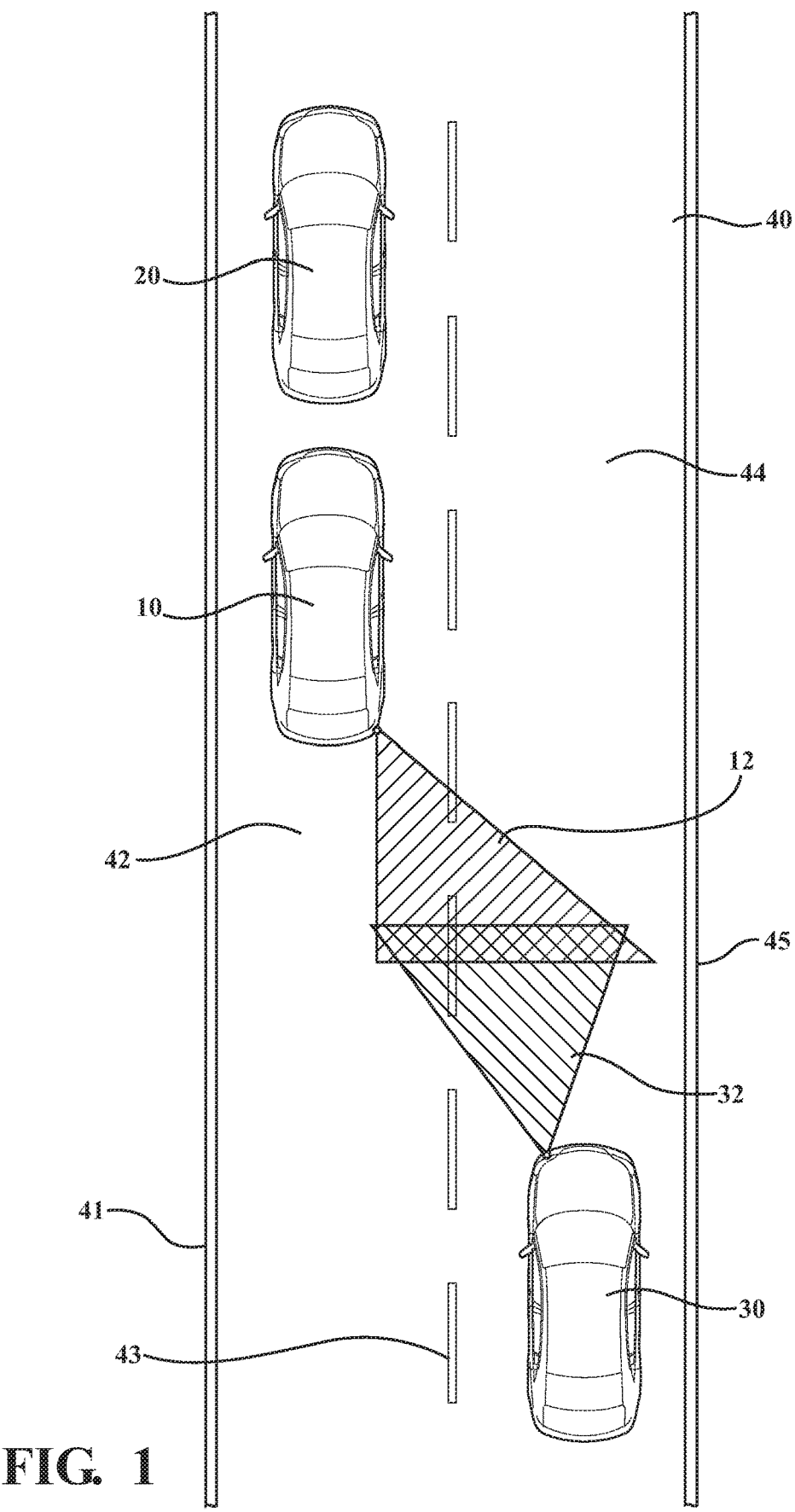
FIG. 1 illustrates an exemplary host vehicle upon a roadway utilizing data from a confederate vehicle behind the host vehicle to classify a portion of a destination lane as clear for a desired lane change, in accordance with the present disclosure.

A process and system for sensor sharing for autonomous lane changing is provided. A host vehicle may include programming commanding a desired lane change. A dynamic controller may include a computerized processor including programming operable to execute a lane change. In a computerized process, the dynamic controller gains permission to execute the desired lane change by classifying as clear a portion of a destination lane into which a desired lane change is planned to occur. The dynamic controller may utilize on-board sensors to detect other vehicles within the portion of the destination lane as a basis for classifying the portion as clear or not-clear. However, there are limits to how far or past what types of obstacles on-board sensors may gather data for the portion of the destination lane. These limits to the on-board sensors may hamper data collection for the portion of the destination lane providing clarity to classify the portion as clear. Further, autonomous or semi-autonomous lane change maneuvers may be complicated when the total change of speed of the vehicle changing lanes is high. For example, if the vehicle changing lanes is behind a slowly moving second vehicle, clearing the vehicle changing lanes to steer into the destination lane and accelerate to a rated speed for that lane may be complicated.

A controller described herein may include a computerized device operable to execute programming. A controller may include a microprocessor, random access memory (RAM), durable memory providing for data storage, and an analog/digital converter operable to enable communication between the controller and a wide variety of electronic devices and sensors. Programming executed by the controller may include algorithms, instructions, computerized processes, and any other similar operations that may be performed by a computerized device. A controller may be a single device, may be a portion of a larger computerized device, or may span several devices.

Multiple vehicles upon a roadway may simultaneously or contemporaneously utilize sensors to monitor portions of the roadway. By using data from multiple vehicles, a more complete map of the roadway may be populated, for example, utilizing sensor data from two or more vehicles to classify a portion of a destination lane as being clear. Vehicles may exchange data directly, for example, through vehicle to vehicle communication. Such communication may be established through radio or wireless communication technology, through use of infrastructure signaling systems, through light or laser communication, through short range wireless communication such as DSRC, or through other similar communication methods and systems in the art. Similarly, vehicles may exchange data through wireless communication through a remote server or a cloud network. For example, multiple vehicles may provide location data to a cloud network, a host vehicle seeking to make a lane change may query the location data to determine whether another vehicle is registered in a certain position upon a roadway, one of the registered vehicles in the certain location may be designated a confederate vehicle able to assist the host vehicle in gathering data about the roadway, and sensor data from the confederate vehicle may be made available to the host vehicle through the cloud network. The exemplary communication methods are provided as non-limiting examples, a number of alternative communication methods are envisioned, and the disclosure is not intended to be limited to the examples provided herein.

Referring now to the drawings, wherein like reference numbers refer to like features throughout the several views, FIG. 1 illustrates an exemplary host vehicle upon a roadway utilizing data from a confederate vehicle behind the host vehicle to classify a portion of a destination as clear for a desired lane change. Host vehicle 10 is illustrated upon roadway 40 following behind a slowly-moving second vehicle 20. Roadway 40 includes a first lane 42 defined by boundary marker 41 and boundary marker 43. Roadway 40 further includes a second lane 44 defined by boundary marker 43 and boundary marker 45. Host vehicle 10, either by designation of a user within host vehicle 10 or through autonomous or semi-autonomous computerized methods operated therein or remotely on behalf of host vehicle 10, has identified a desired lane change from first lane 42 to second lane 44. Autonomous and semi-autonomous computerized methods for controlling a vehicle may include control over steering, acceleration, and braking. Autonomous and semi-autonomous computerized methods can be used for purposes of lane keeping, lane changing, adaptive cruise control, autonomous braking, obstacle avoidance, and other similar purposes. The required maneuver will include steering the host vehicle 10 laterally from first lane 42 into second lane 44, and it will also include longitudinally accelerating second vehicle 20 to the rated speed of second lane 44. In order for the desired lane change to be authorized, a dynamic controller within host vehicle 10 may analyze available data from sensors monitoring second lane 44 to determine whether a portion of the second lane 44 to the right and rear of host vehicle 10 may be classified as clear. In this example, the second lane 44 may be described as the destination lane into which the desired lane change is to occur. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle may communicate with another vehicle, in the example of FIG. 1, with confederate vehicle 30. Through the established communication, host vehicle 10 may utilize data from sensors of confederate vehicle 30, in combination with data from on-board sensors of host vehicle 10, to classify the portion of the second lane 44 as clear.

Having enough perception range behind host vehicle 10 is useful to executing an autonomous or semi-autonomous lane change. A calculated perception range to initiate a lane change may in one embodiment depend upon time ($T_{lx}$) it takes host vehicle 10 to reach a target velocity. A target velocity may be set in a number of ways, for example, based upon a speed limit defining a maximum allowable speed or a lead vehicle speed which host vehicle 10 is being commanded to follow. In one exemplary embodiment, the dynamic controller may assume that confederate vehicle 30 will continue in a current trajectory (traveling at its normal driving velocity ($V_{rv}$)) and refuse to yield to host vehicle 10. Under such an assumption, the calculated perception range ($D_{rear}$) which is to be classified as clear in order to command the lane change may be set by the following equation $$D_{rear}=V_{rv}*T_{lx} \qquad (1)$$

If the distance defined by $D_{rear}$ is beyond the effective perception range of host vehicle 10, the actual perception range of on-board sensors of host vehicle 10, then the dynamic controller of host vehicle 10 cannot initiate the lane change without extra information. In an example assuming constant longitudinal acceleration of host vehicle 10, $T_{lx}$ may be determined as follows.

$$T_{lx}=(V_{tg}-V_{hv})/a_{hv} \qquad (2)$$

wherein $V_{tg}$ is the target speed of host vehicle 10 after the lane change, wherein $V_{hv}$ is the current speed of host vehicle 10, and wherein $a_{hv}$ is the acceleration of the host vehicle through the lane change maneuver. Equation 2 is provided as a simplistic model of determining a total time to execute a desired lane change, and similar equations may be determined using knowledge in the art based upon non-constant acceleration.

By analyzing data generated regarding a portion of the destination lane into which the host vehicle is to move within the calculated perception range, a determination may be made whether or not to classify the portion of the destination lane as clear and whether to authorize the desired lane change. In one embodiment, a factor of safety or an offset value may be utilized to increase a size of the calculated perception range and ensure orderly lane change maneuvers.

By comparing the calculated perception range to an effective perception range of sensors of the host vehicle a determination may be made whether the sensors of the host vehicle are capable of covering the calculated perception range. Based upon the availability, location, and other factors such as environmental visibility, effective perception ranges of one or more confederate vehicles may be analyzed and overlaid with the effective range of the host vehicle's sensors. In one exemplary condition, the host vehicle and two separate confederate vehicles may be in positions to gather data regarding the calculated perception range; however, a gap might exist between the effective perception ranges which creates a "blind spot." The disclosed processes may include an analysis and determination regarding whether a combination of the host vehicle's effective perception range and the effective perception range(s) of available confederate vehicle(s) adequately cover the calculated perception range and eliminate any blind spots. A calculated perception range may be used to define a portion of the destination lane that is to be classified as clear in order to enable initiation of a lane change maneuver.

Effective perception range of a particular sensor may include a maximum design range, for example, a maximum range at which an object will return a discernable return signal to a radar sensor under perfect or laboratory conditions. Effective perception range can be decreased from the maximum design range by a number of factors. For example, fog or rain may impede an ability of a sensor to detect object out to a maximum range. In another example, objects may intervene between a sensor and an area of a road being monitored, for example, with a vehicle in traffic blocking or obscuring an entirety or a portion of a field of view of the sensor. Controllers within the host vehicle 10 and/or a confederate vehicle 30 may evaluate factors that affect the effective perception ranges of each of the sensors being monitored and determine effective perception ranges for each of the sensors, including environmental factors, obscuring factors, and other similar factors.

In evaluating the effective perception ranges of available sensors, controllers in the host vehicle 10 and/or a confederate vehicle 30 may individually or collectively determine 1) a road surface area in a destination lane that would be recommended to complete a lane change maneuver and 2) the effective perception ranges of sensors that would be recommended to classify the road surface area in the destination lane as clear such that the lane change maneuver may be initiated. If a gap or blind slot exists within the road surface area, wherein no available sensor is providing data regarding whether an obstacle exist within that blind spot, then the destination lane cannot be classified as clear.

In FIG. 1, an exemplary effective perception range 12 of host vehicle 10 is illustrated in combination with an exemplary effective perception range 32 of confederate vehicle 30, with effective perception range 12 and effective perception range 32 collectively covering a portion of second lane 44 and generating data useful to classify the portion of second lane 44 as clear. The portion of second lane 44 may be described as a road surface area or a region upon the road surface which is recommended to be clear prior to initiating a lane change maneuver.

Figure 2:
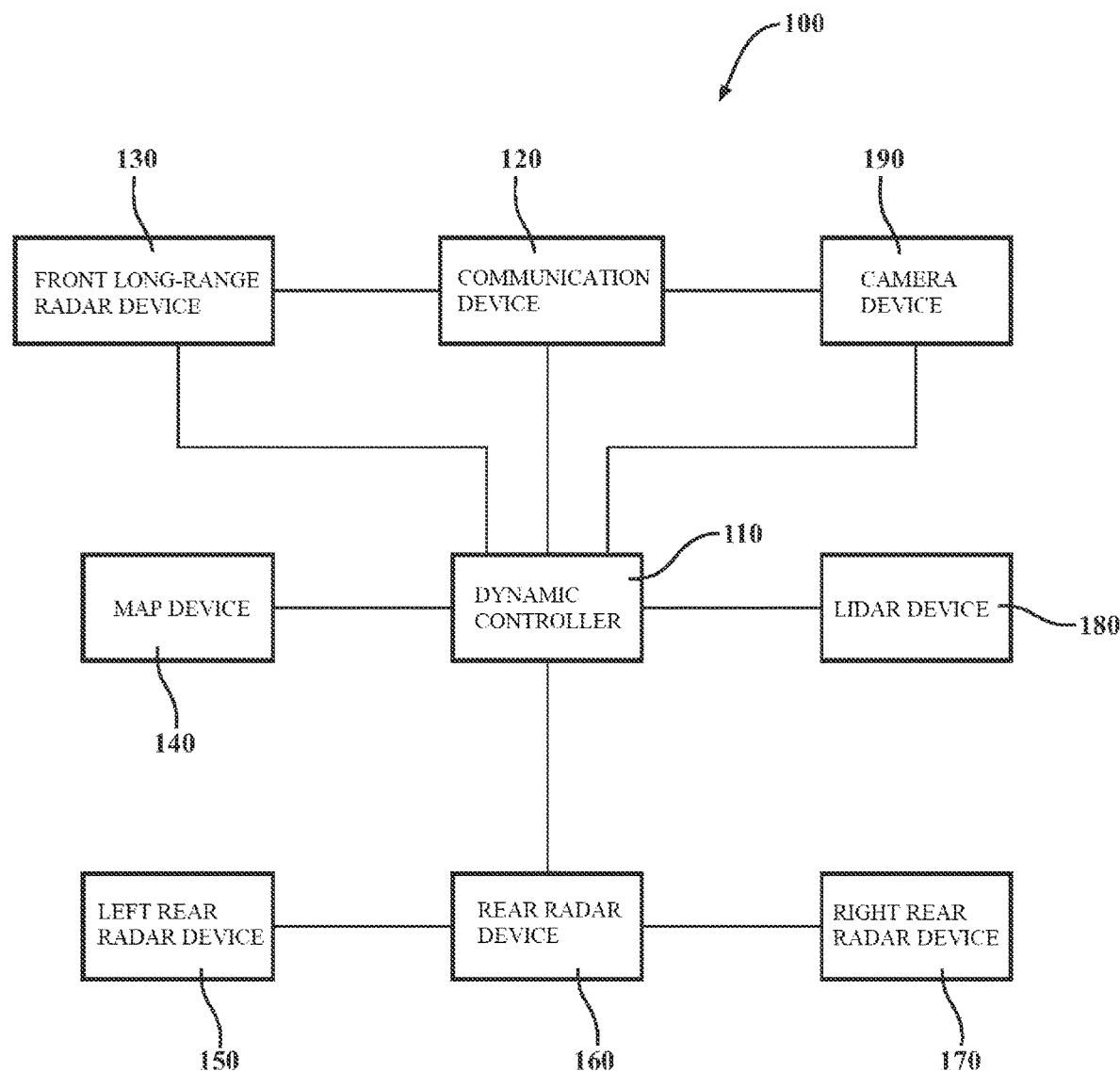
FIG. 2 schematically illustrates an exemplary vehicle system configuration useful to enable operation of the disclosed process to share vehicle data, in accordance with the present disclosure.

FIG. 2 schematically illustrates an exemplary vehicle system configuration useful to enable operation of the disclosed process to share vehicle data. System 100 may be installed upon a host vehicle or a confederate vehicle. System 100 is illustrated including dynamic controller 110. Dynamic controller 110 includes a computerized processor including random access memory and access to durable memory storage and is operable to execute programmed code. Dynamic controller 110 may include one physical device or may span a plurality of physical devices. Dynamic controller 110 is in signal communication with a plurality of devices and computerized controllers throughout the host vehicle 10. Dynamic controller 110 may communicate either through wired connections, for example, through a communication bus, or wirelessly through wireless communication.

System 100 further includes communication device 120 which may include hardware and/or software capable of establishing direct vehicle to vehicle communication, wireless communication through a cellular or other wireless network, or other similar communication methods.

System 100 further includes front long-range radar device 130, left rear radar device 150, rear radar device 160, and right rear radar device 170. Front long-range radar device 130, left rear radar device 150, rear radar device 160, and right rear radar device 170 are exemplary, and represent one or more radar devices that may be installed upon and usable by a vehicle to generate data regarding an environment around the vehicle.

System 100 further includes map device 140. Map device 140 may include a database and/or programming configured to access a database regarding a map of roadways upon which the vehicle may travel. Map device 140 may further include software to generate a localized map of a surrounding environment of the vehicle including lane markings, locations and trajectories of other vehicles and obstacles, and other useful information relative to navigating the surrounding environment.

System 100 further includes LIDAR device 180. LIDAR is defined as Light Detection and Ranging. LIDAR device 180 includes hardware and/or software operable to generate data regarding an environment around the vehicle.

System 100 further includes camera device 190. Camera device 190 includes hardware and/or software operable to generate data regarding an environment around the vehicle by capturing and/or analyzing images of the environment, for example, through image recognition techniques in the art.

Front long-range radar device 130, left rear radar device 150, rear radar device 160, right rear radar device 170, LIDAR device 180, and camera device 190 are exemplary sensors that may be available to classify a portion of a destination lane as clear. Other sensors may include ultrasonic devices, audio devices, laser emitting devices, and other similar devices operable to identify presences of an objection upon a portion of a roadway.

System 100 is provided as a non-limiting exemplary system to operate the disclosed processes within a vehicle. Devices and/or functionality may be added or removed from alternative embodiments of system 100 with similar operation continuing to be enabled.

Figure 3:
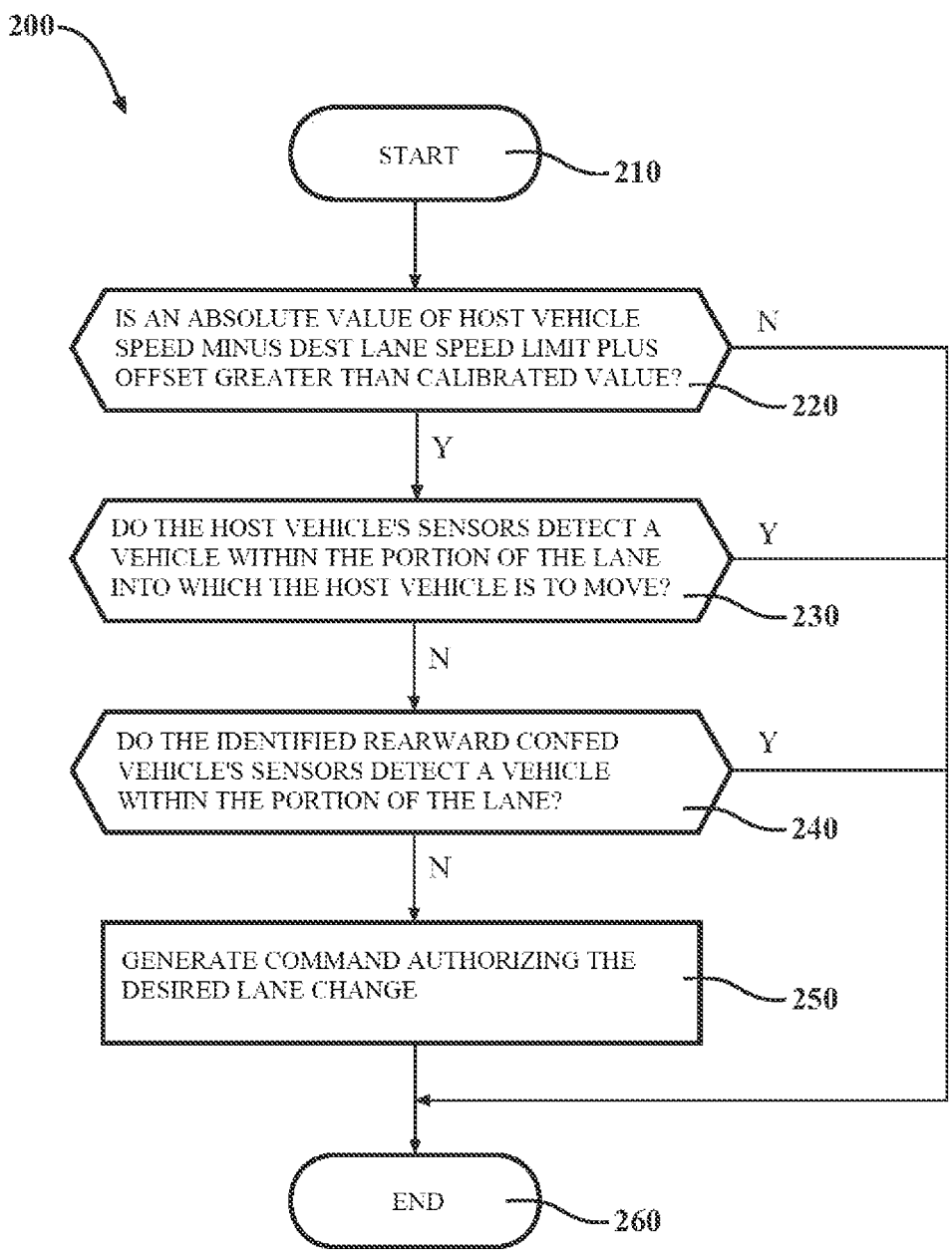
FIG. 3 is a flowchart illustrating an exemplary process operable to execute the desired lane change illustrated in FIG. 1, in accordance with the present disclosure.

FIG. 3 is a flowchart illustrating an exemplary process 200 operable to execute the desired lane change illustrated in FIG. 1. Process 200 starts at step 210, where a desired lane change maneuver by a host vehicle into a portion of a destination lane has been identified. Further, at step 210, a determination has been made that the effective range of sensors of the host vehicle does not fully cover the portion of the destination lane. Further, at step 210, a confederate vehicle 30 rearward of the host vehicle 10 has been identified and determined to be in a position to generate data regarding a remainder of the portion of the destination lane not covered by the effective range of the sensors of the host vehicle 10. At step 220, a determination is made whether an absolute value of 1) host vehicle speed 2) minus a destination lane speed limit 3) plus an offset value is greater than a calibrated value. If the absolute value of the sum of these three terms is not more than the calibrated value, the process proceeds to step 260, where the process ends and the vehicle does not initiate the lane change maneuver. If the absolute value of the sum of these three terms is more than the calibrated value, the process advances to step 230. At step 230, a determination is made whether the host vehicle 10's sensors detect a vehicle within the portion of the destination lane into which the host vehicle is to move. If a vehicle is detected by the host vehicle 10's sensors in the portion of the destination lane, the process advances to step 260, where the process ends and the host vehicle 10 does not initiate the lane change maneuver. If no vehicle is detected by the host vehicle 10's sensor in the portion of the destination lane, the process advances to step 240. At step 240, a determination is made whether the identified rearward confederate vehicle's sensors detect a vehicle within the portion of the destination lane into which the host vehicle 10 is to move. If a vehicle is detected by the confederate vehicle's sensors in the portion of the destination lane, the process advances to step 260, where the process ends and the host vehicle 10 does not initiate the lane change maneuver. If no vehicle is detected by the confederate vehicle 30's sensor in the portion of the destination lane, the process advances to step 250. At step 250, a command is provided authorizing the desired lane change. At step 260, the process ends. Process 200 is exemplary, a number of additional and/or alternative steps are envisioned, and the disclosure is not intended to be limited to the examples provided herein.

Figure 4:
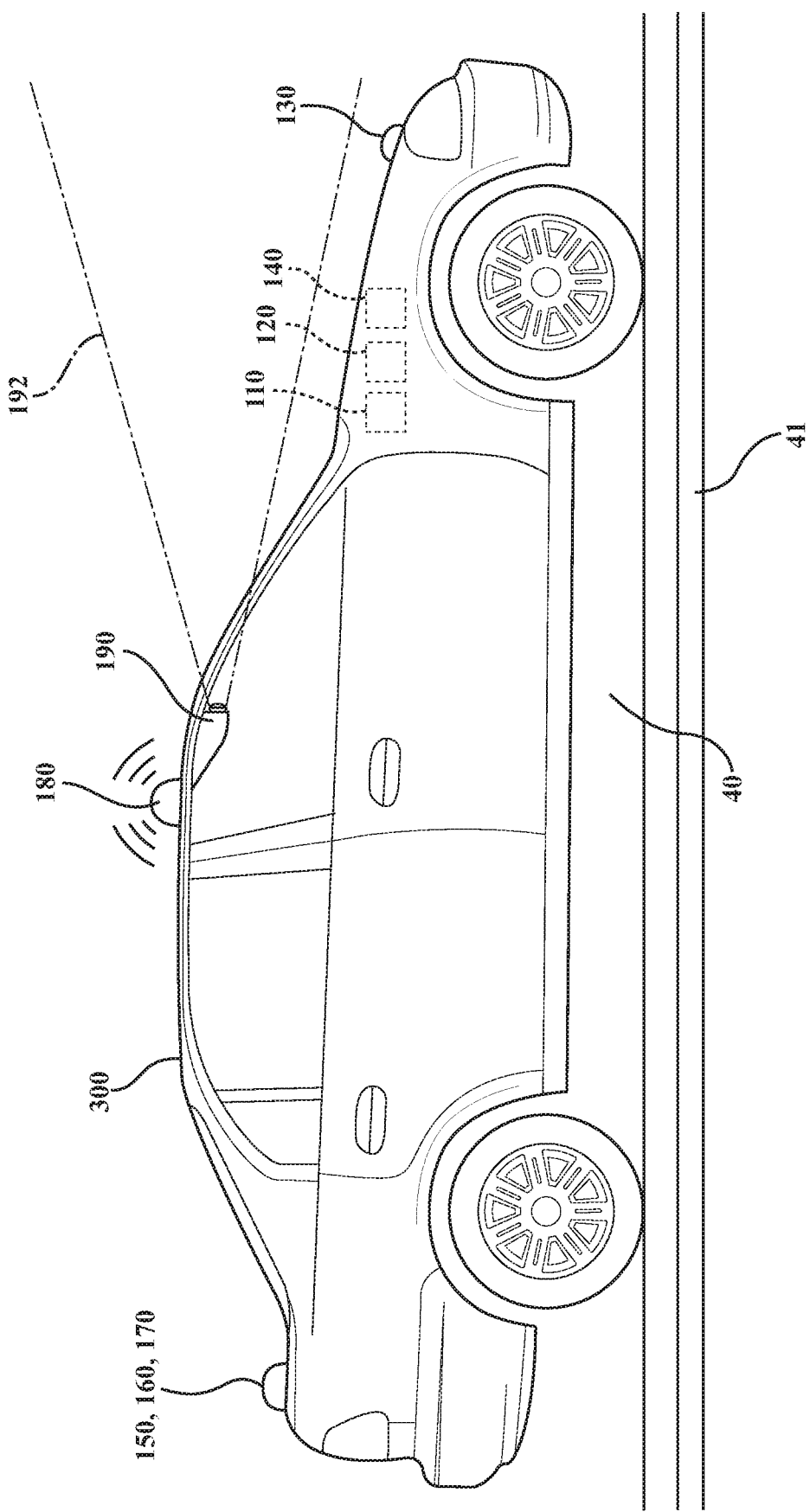
FIG. 4 schematically illustrates an exemplary vehicle including hardware and devices useful to execute the disclosed processes, in accordance with the present disclosure.

FIG. 4 schematically illustrates an exemplary vehicle 300 including hardware and devices useful to execute the disclosed processes. Vehicle 300 is illustrated including dynamic controller 110, communication device 120, front long-range radar device 130, map device 140, left rear radar device 150, rear radar device 160, right rear radar device 170, LIDAR device 180, and camera device 190. Camera device 190 includes field of view 192 through which camera device 190 may capture images. Vehicle 300 is illustrated upon roadway 40 including boundary marker 41. Vehicle 300 is provided as an exemplary host vehicle or an exemplary confederate vehicle.

Figure 5:
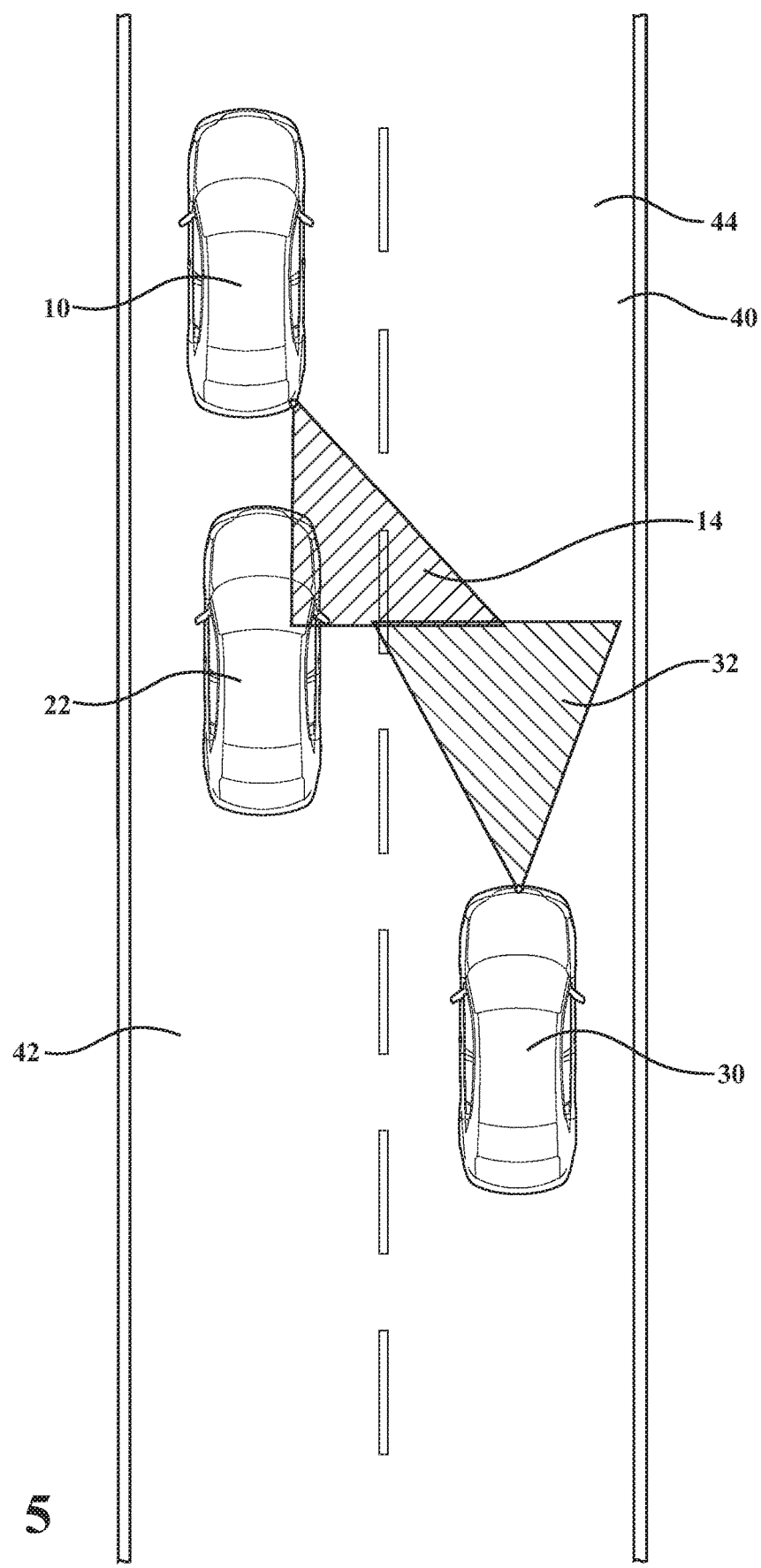
FIG. 5 illustrates an alternative exemplary host vehicle upon a roadway utilizing data from a confederate vehicle to classify a portion of a destination lane as clear for a desired lane change, wherein a third vehicle is situated in a position that partially obscures the on-board sensors of the host vehicle, in accordance with the present disclosure.

FIG. 5 illustrates an alternative exemplary host vehicle 10 upon a roadway utilizing data from a confederate vehicle to classify a portion of a destination as clear for a desired lane change, wherein a third vehicle is situated in a position that partially obscures the on-board sensors of the host vehicle. Host vehicle 10 is illustrated upon roadway 40. A nearby vehicle 22 is located rearward of host vehicle 10. Nearby vehicle 22 is situated in a location that partially obscures the field of view of the sensors of host vehicle 10. Roadway 40 includes a first lane 42 and a second lane 44. Host vehicle 10, either by designation of a user within host vehicle 10 or through autonomous or semi-autonomous computerized methods operated therein or remotely on behalf of host vehicle 10, has identified a desired lane change from first lane 42 to second lane 44. In order for the desired lane change to be authorized, a dynamic controller within host vehicle 10 may analyze available data from sensors monitoring second lane 44 to determine whether a portion of the second lane 44 to the right and rear of host vehicle 10 may be classified as clear. In this example, second lane 44 may be described as the destination lane into which the desired lane change is to occur. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle may communicate with another vehicle, in the example of FIG. 5, with confederate vehicle 30. Through the established communication, host vehicle 10 may utilize data from sensors of confederate vehicle 30, in combination with data from on-board sensors of host vehicle 10, to classify the portion of second lane 44 as clear.

In FIG. 5, an exemplary effective perception range 14 of host vehicle 10 is illustrated shortened in comparison to effective perception range 12 of FIG. 1 due to nearby vehicle 22 obscuring the sensors of host vehicle 10 in FIG. 5. An exemplary effective perception range 32 of confederate vehicle 30 is additionally illustrated, with effective perception range 14 and effective perception range 32 collectively covering a portion of second lane 44 and generating data useful to classify the portion of second lane 44 as clear.

Figure 6:
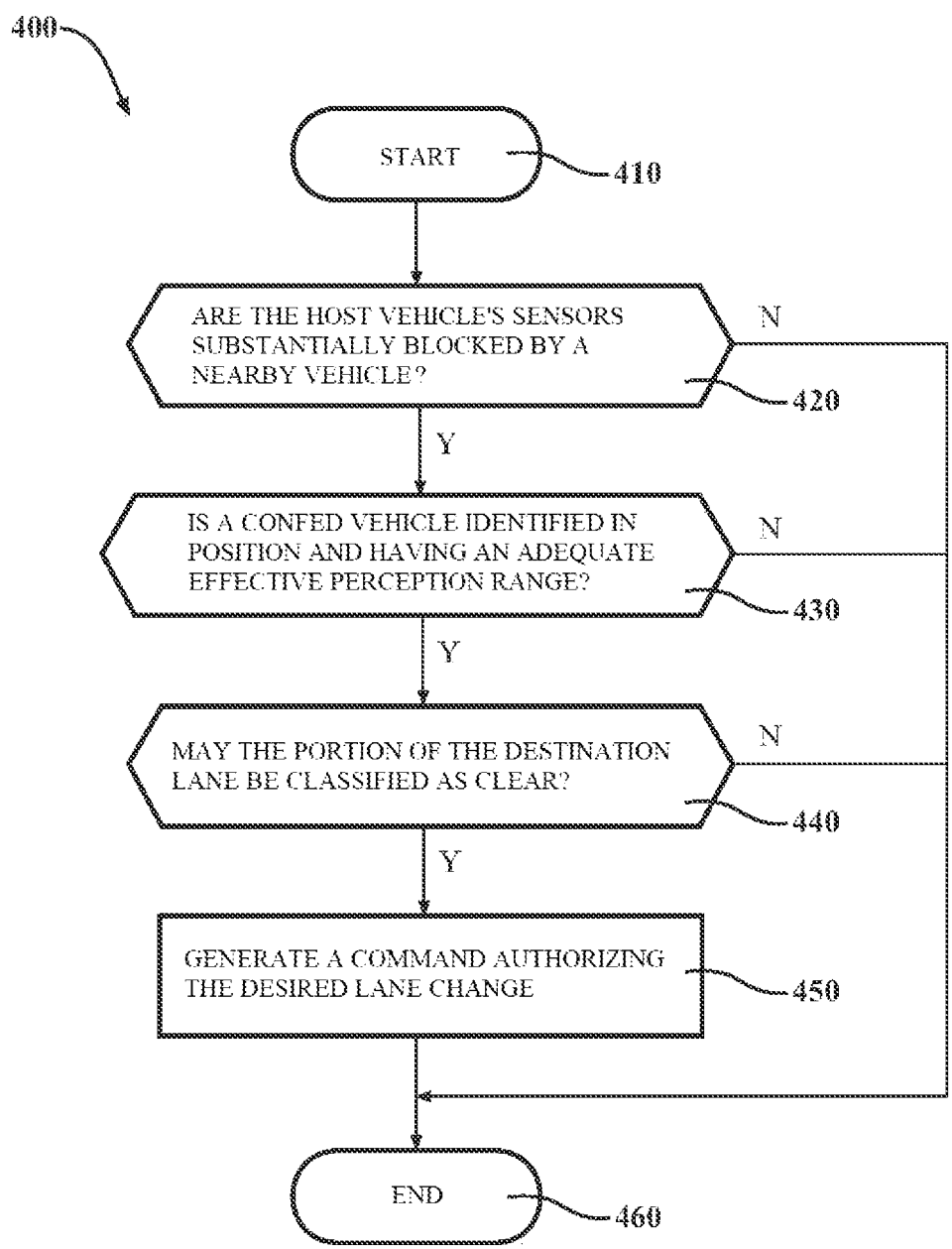
FIG. 6 is a flowchart illustrating an exemplary process operable to execute the desired lane change illustrated in FIG. 5, in accordance with the present disclosure.

FIG. 6 is a flowchart illustrating an exemplary process 400 operable to execute the desired lane change illustrated in FIG. 5. Process 400 starts at step 410, where at a desired lane change maneuver by a host vehicle 10 into a portion of a destination lane has been identified. At step 420, a determination is made whether the host vehicle 10's sensors are substantially blocked or obscured by a nearby vehicle 22. A sensor being blocked or obscured by another vehicle or obstacle may include an entirety or a portion of a field of view of the sensor being blocked, thereby limiting or reducing an effective perception range of the sensor. If the host vehicle 10's sensors are not blocked by a nearby vehicle 22, the process proceeds to step 460, where the process ends. It is noted that process 400 is directed specifically to authorizing a lane change in light of a detected nearby vehicle 22 partially obscuring the effective range of the host vehicle 10's sensors. In one embodiment, after process 400 ends due to no nearby vehicle 22 being present, the system may subsequently operate process 200 of FIG. 2. If a nearby vehicle 22 does obscure sensors of the host vehicle 10, the process advances to step 430. At step 430, a determination is made whether a confederate vehicle 30 may be identified as being in position and having threshold effective perception range to gather adequate data regarding the portion of the destination lane. If no confederate vehicle 30 with threshold effective perception range is identified, the process advances to step 460, where the process ends and the host vehicle 10 does not initiate the lane change maneuver. If a confederate vehicle 30 with threshold effective perception range is identified, the process advances to step 440. At step 440, a determination is made whether the portion of the destination lane may be classified as clear. If the portion of the destination lane is not clear, the process advances to step 460, where the process ends and the host vehicle 10 does not initiate the lane change maneuver. If the portion of the destination lane is clear, the process advances to step 450. At step 450, a command is provided authorizing the desired lane change. At step 460, the process ends. Process 400 is exemplary, a number of additional and/or alternative steps are envisioned, and the disclosure is not intended to be limited to the examples provided herein.

Figure 7:
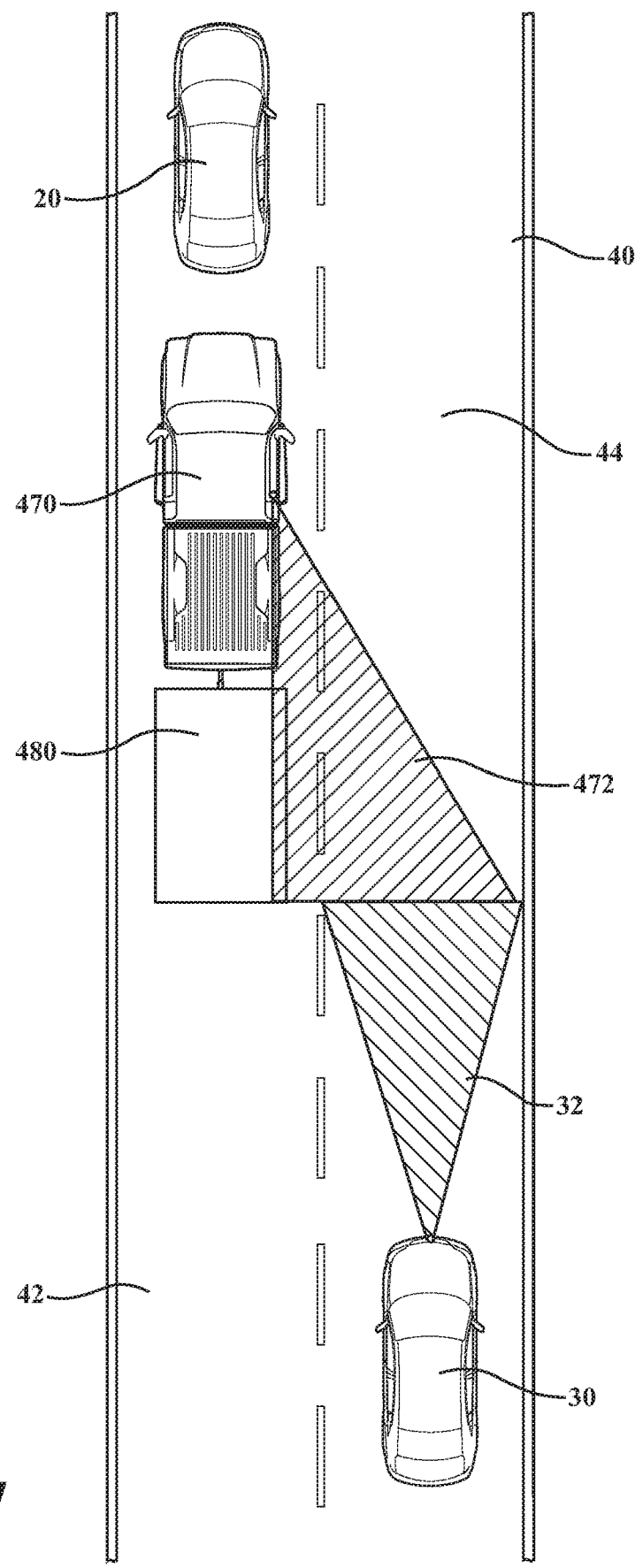
FIG. 7 illustrates an alternative exemplary host vehicle upon a roadway utilizing data from a confederate vehicle to classify a portion of a destination lane as clear for a desired lane change, wherein the host vehicle includes a trailer, in accordance with the present disclosure.

FIG. 7 illustrates an alternative exemplary host vehicle 470 upon a roadway utilizing data from a confederate vehicle to classify a portion of a destination as clear for a desired lane change, wherein the host vehicle includes a trailer. Host vehicle 470 is illustrated upon roadway 40 following behind a slowly-moving second vehicle 20. Host vehicle 470 is illustrated towing trailer 480. Trailer 480 may include a cargo trailer, a boat, a camper unit, or any other similar towable item. Trailer 480 may occlude or partially obscure sensors of host vehicle 470. Roadway 40 includes a first lane 42 and a second lane 44. Host vehicle 470, either by designation of a user within host vehicle 470 or through autonomous or semi-autonomous computerized methods operated therein or remotely on behalf of host vehicle 470, has identified a desired lane change from first lane 42 to second lane 44. In order for the desired lane change to be authorized, a dynamic controller within host vehicle 470 may analyze available data from sensors monitoring second lane 44 to determine whether a portion of the second lane 44 to the right and rear of host vehicle 470 may be classified as clear. In this example, second lane 44 may be described as the destination lane into which the desired lane change is to occur. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle may communicate with another vehicle, in the example of FIG. 7, with confederate vehicle 30. Through the established communication, host vehicle 470 may utilize data from sensors of confederate vehicle 30, in combination with data from on-board sensors of host vehicle 470, to classify the portion of second lane 44 as clear.

In FIG. 7, an exemplary effective perception range 472 of host vehicle 470 is illustrated shortened in comparison to effective perception range 472 of FIG. 1 due to trailer 480 obscuring the sensors of host vehicle 470 in FIG. 7. An exemplary effective perception range 32 of confederate vehicle 30 is additionally illustrated, with effective perception range 472 and effective perception range 32 collectively covering a portion of second lane 44 and generating data useful to classify the portion of second lane 44 as clear.

Figure 8:
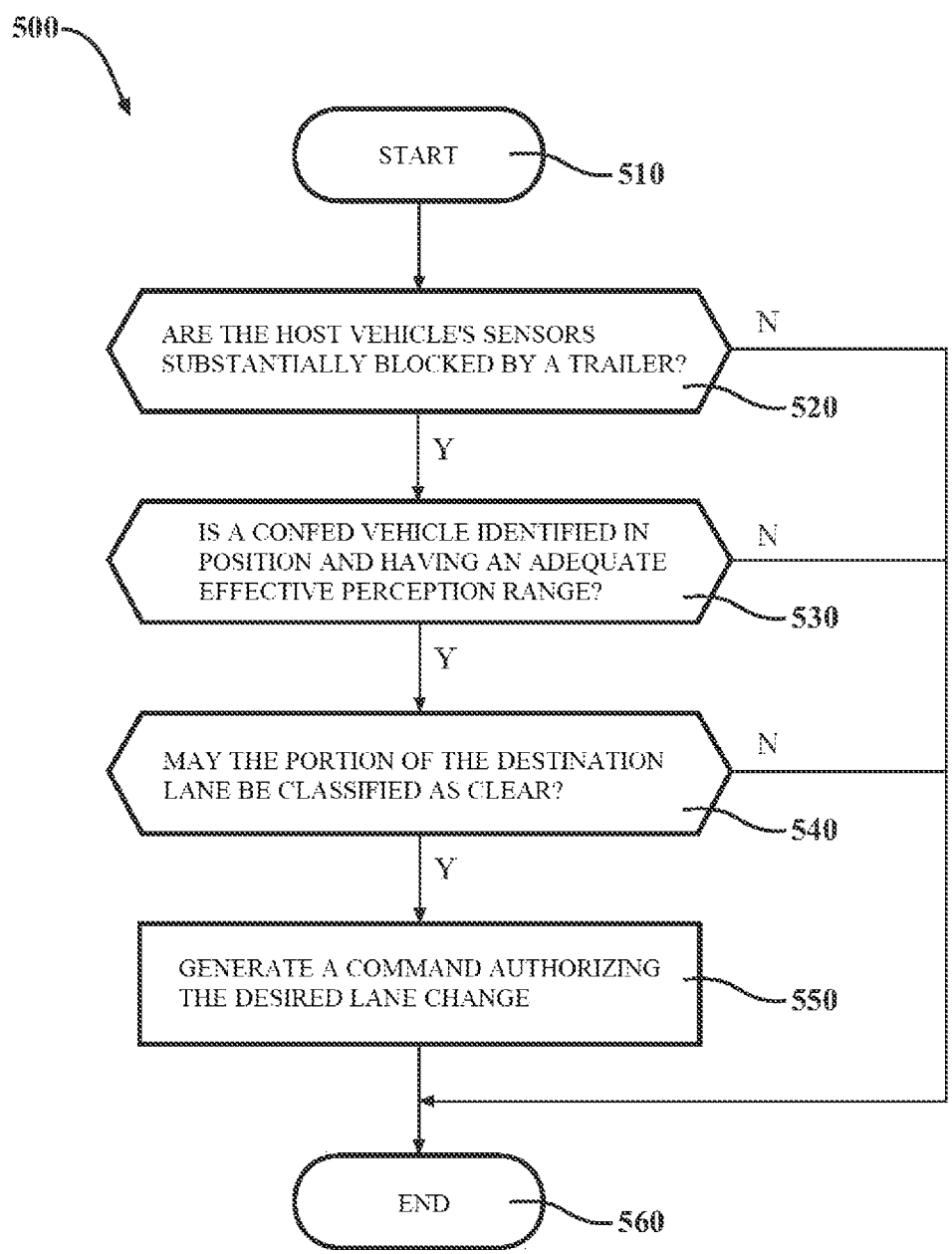
FIG. 8 is a flowchart illustrating an exemplary process operable to execute the desired lane change illustrated in FIG. 7, in accordance with the present disclosure.

FIG. 8 is a flowchart illustrating an exemplary process 500 operable to execute the desired lane change illustrated in FIG. 7. Process 500 starts at step 510, where at a desired lane change maneuver by a host vehicle 470 into a portion of a destination lane has been identified. Further, at step 510, a determination has been made that the effective range of sensors of the host vehicle 470 does not fully cover the portion of the destination lane. At step 520, a determination is made whether the host vehicle 470's sensors are substantially blocked by a trailer 480. If the host vehicle 470's sensors are not blocked by a trailer 480, the process proceeds to step 560, where the process ends. It is noted that process 500 is directed specifically to authorizing a lane change in light of a trailer 480 partially obscuring the effective range of the host vehicle 470's sensors. In one embodiment, after process 500 ends due to no trailer 480 being present, the system may subsequently operate process 200 of FIG. 2. If a trailer 480 does obscure sensors of the host vehicle 470, for example, by partially or fully blocking an entirety or a portion of a field of view of the sensors, the process advances to step 530. At step 530, a determination is made whether a confederate vehicle 30 may be identified as being in position and having threshold effective perception range to gather adequate data regarding the portion of the destination lane. If no confederate vehicle 30 with threshold effective perception range is identified, the process advances to step 560, where the process ends and the host vehicle 470 does not initiate the lane change maneuver. If a confederate vehicle 30 with threshold effective perception range is identified, the process advances to step 540. At step 540, a determination is made whether the portion of the destination lane may be classified as clear. If the portion of the destination lane is not clear, the process advances to step 560, where the process ends and the host vehicle 470 does not initiate the lane change maneuver. If the portion of the destination lane is clear, the process advances to step 550. At step 550, a command is provided authorizing the desired lane change. At step 560, the process ends. Process 500 is exemplary, a number of additional and/or alternative steps are envisioned, and the disclosure is not intended to be limited to the examples provided herein.

Figure 9:
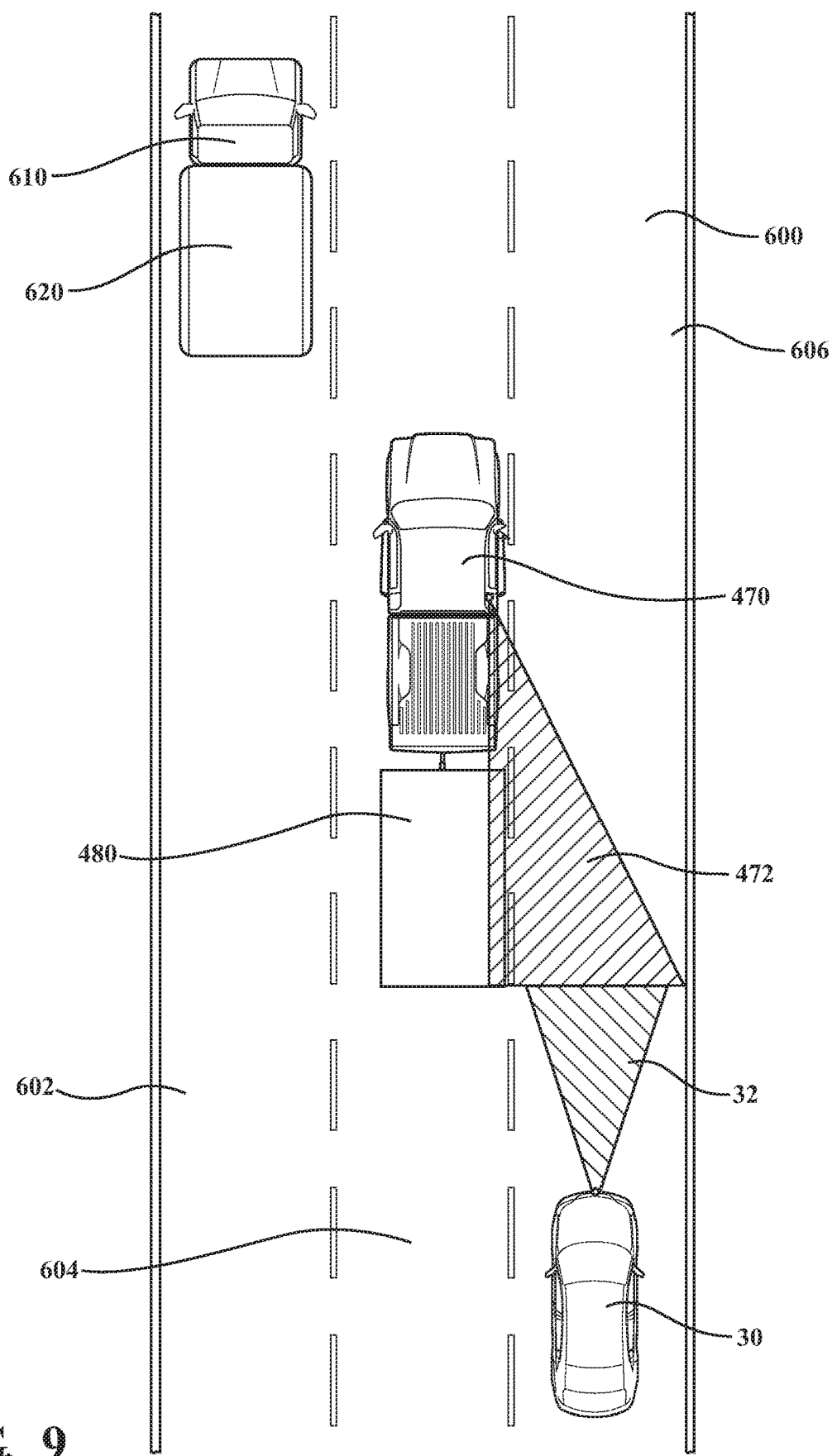
FIG. 9 illustrates an alternative exemplary host vehicle upon a roadway utilizing data from a confederate vehicle to classify a portion of a destination lane as clear for a desired maneuver, wherein the host vehicle is utilizing an auxiliary control process of dynamic offset to maintain a minimum distance from an oversized vehicle, in accordance with the present disclosure.

FIG. 9 illustrates an alternative exemplary host vehicle 470 upon a roadway utilizing data from a confederate vehicle to classify a portion of a destination as clear for a desired maneuver, wherein the host vehicle is utilizing an auxiliary control process of dynamic offset to maintain a minimum distance from an oversized vehicle. Host vehicle 470 is illustrated upon roadway 600 approaching an oversized vehicle 620 embodied as an oversized load being pulled by a commercial truck 610. Host vehicle 470 is illustrated towing trailer 480. Trailer 480 may occlude or partially obscure sensors of host vehicle 470. Roadway 600 includes a first lane 602, second lane 604, and a third lane 606. Host vehicle 470, either by designation of a user within host vehicle 470 or through autonomous or semi-autonomous computerized methods operated therein or remotely on behalf of host vehicle 470, has identified an offset to be observed in relation to oversized vehicle 620. The offset in relation to oversized vehicle 620 provides a lateral adjustment of host vehicle 470 and trailer 480, wherein host vehicle 470 moves out of the center of second lane 604 and may move partially into third lane 606 to avoid getting close to oversized vehicle 620. The offset of host vehicle 470 may be described as a lane change maneuver, wherein the destination lane may be identified as third lane 606. While host vehicle 470 may or may not actually enter third lane 606, the lateral adjustment of host vehicle 470 toward third lane 606 may in some embodiment be authorized when the adjacent portion of third lane 606 is classified as clear. In order for the desired lane change to be authorized, a dynamic controller within host vehicle 470 may analyze available data from sensors monitoring third lane 606 to determine whether a portion of the third lane 606 to the right and rear of host vehicle 470 may be classified as clear. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle may communicate with another vehicle, in the example of FIG. 9, with confederate vehicle 30. Through the established communication, host vehicle 470 may utilize data from sensors of confederate vehicle 30, in combination with data from on-board sensors of host vehicle 470, to classify the portion of third lane 606 as clear.

In FIG. 9, an exemplary effective perception range 472 of host vehicle 470 is illustrated shortened in comparison to effective perception range 472 of FIG. 1 due to trailer 480 obscuring the sensors of host vehicle 470 in FIG. 9. An exemplary effective perception range 32 of confederate vehicle 30 is additionally illustrated, with effective perception range 472 and effective perception range 32 collectively covering a portion of third lane 606 and generating data useful to classify the portion of third lane 606 as clear.

Figure 10:
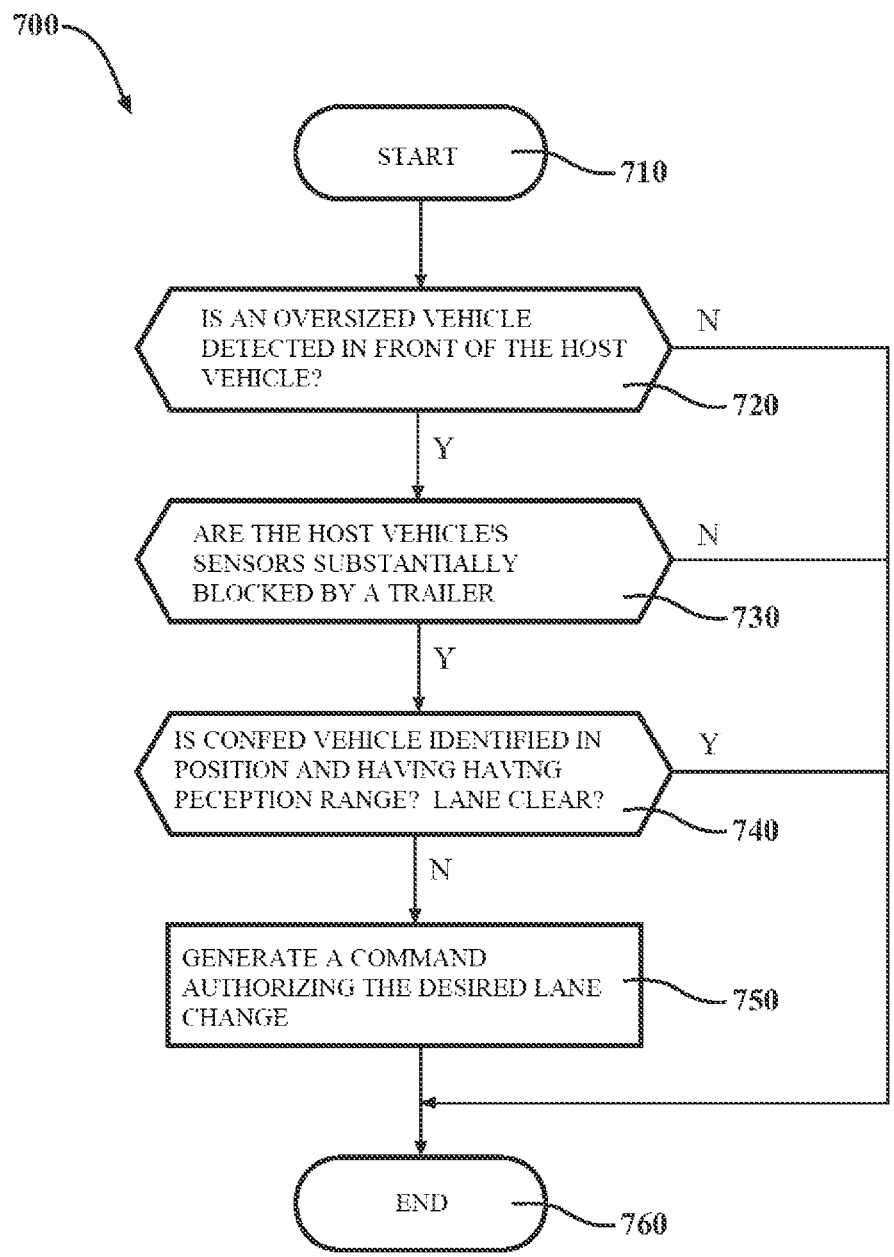
FIG. 10 is a flowchart illustrating an exemplary process operable to execute the desired lane change illustrated in FIG. 9, in accordance with the present disclosure.

FIG. 10 is a flowchart illustrating an exemplary process 700 operable to execute the desired lane change illustrated in FIG. 9. Process 700 starts at step 710, where at a desired lane change maneuver by a host vehicle 470 into a portion of a destination lane has been identified. Further, at step 710, a determination has been made that the effective range of sensors of the host vehicle 470 does not fully cover the portion of the destination lane. At step 720, a determination is made whether an oversized vehicle 620 is detected in front of the host vehicle 470. If no oversized vehicle 620 is detected, the process proceeds to step 760, where the process ends. It is noted that process 700 is directed specifically to authorizing a lane change in light of an oversized vehicle 620 being detected. In one embodiment, after process 700 ends due to no oversized vehicle 620 being present, the system may subsequently operate process 200 of FIG. 2. If an oversized vehicle 620 is present, the process advances to step 730. At step 730, a determination is made whether the host vehicle 470's sensors are substantially blocked by a trailer 480. If the host vehicle 470's sensors are not blocked by a trailer 480, the process proceeds to step 760, where the process ends and the host vehicle 470 does not initiate the lane change maneuver. If a trailer 480 does obscure sensors of the host vehicle, the process advances to step 740. At step 740, a determination is made whether a confederate vehicle 30 may be identified as being in position and having threshold effective perception range to gather adequate data regarding the portion of the destination lane and further whether the portion of the destination lane is clear. If no confederate vehicle 30 with threshold effective perception range is identified or if the lane is not clear, the process advances to step 760, where the process ends and the host vehicle 470 does not initiate the lane change maneuver. If a confederate vehicle 30 with threshold effective perception range is identified and further the portion of the destination lane is determined to be clear, the process advances to step 750. At step 750, a command is provided authorizing the desired lane change. At step 760, the process ends. Process 700 is exemplary, a number of additional and/or alternative steps are envisioned, and the disclosure is not intended to be limited to the examples provided herein.

Figure 11:
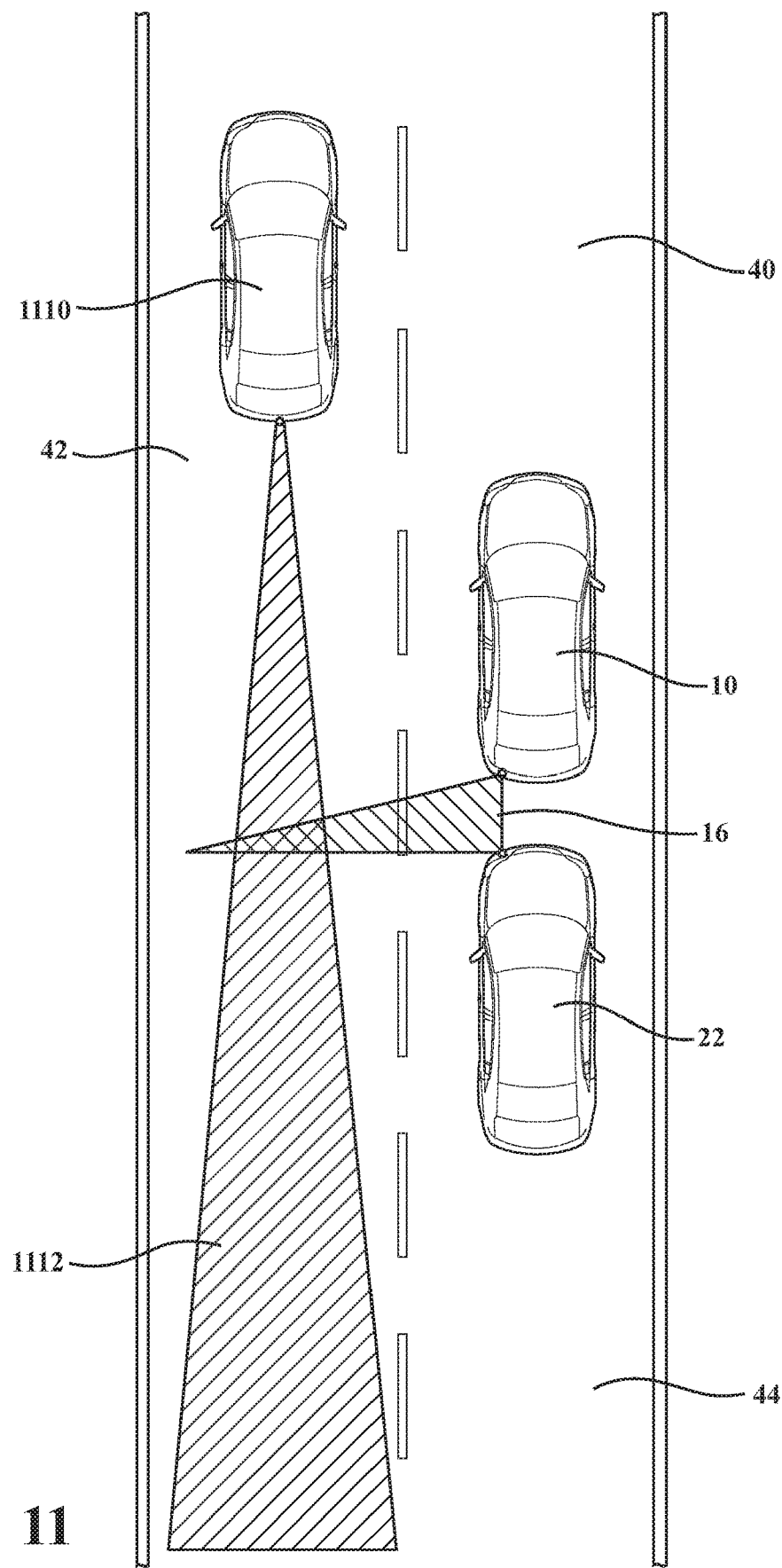
FIG. 11 illustrates an alternative exemplary host vehicle upon a roadway utilizing data from a confederate vehicle ahead of the host to classify a portion of a destination lane as clear for a desired lane change, wherein a third vehicle is situated in a position that partially obscures the on-board sensors of the host vehicle, in accordance with the present disclosure.

FIG. 11 illustrates an alternative exemplary host vehicle 10 upon a roadway utilizing data from a confederate vehicle 1110 ahead of the host vehicle 10 to classify a portion of a destination as clear for a desired lane change, wherein a third vehicle is situated in a position that partially obscures the on-board sensors of the host vehicle 10. Host vehicle 10 is illustrated upon roadway 40. A nearby vehicle 22 is located rearward of host vehicle 10. Nearby vehicle 22 is situated in a location that partially obscures use of a right rear radar device 170 of host vehicle 10. Roadway 40 includes a first lane 42 and a second lane 44. Host vehicle 10, either by designation of a user within host vehicle 10 or through autonomous or semi-autonomous computerized methods operated therein or remotely on behalf of host vehicle 10, has identified a desired lane change from second lane 44 to first lane 42. In order for the desired lane change to be authorized, a dynamic controller within host vehicle 10 may analyze available data from sensors monitoring first lane 42 to determine whether a portion of the first lane 42 to the left and rear of host vehicle 10 may be classified as clear. In this example, first lane 42 may be described as the destination lane into which the desired lane change is to occur. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle 10 may communicate with another vehicle, in the example of FIG. 11, with confederate vehicle 1110. Through the established communication, host vehicle 10 may utilize data from sensors of confederate vehicle 1110, in combination with data from on-board sensors of host vehicle 10, to classify the portion of first lane 42 as clear.

In FIG. 11, an exemplary effective perception range 16 of host vehicle 10 is illustrated shortened in comparison to effective perception range 12 of FIG. 1 due to nearby vehicle 22 obscuring the sensors of host vehicle 10 in FIG. 11. An exemplary effective perception range 1112 of confederate vehicle 1110 is additionally illustrated, with effective perception range 16 and effective perception range 1112 collectively covering a portion of first lane 42 and generating data useful to classify the portion of first lane 42 as clear.

Figure 12:
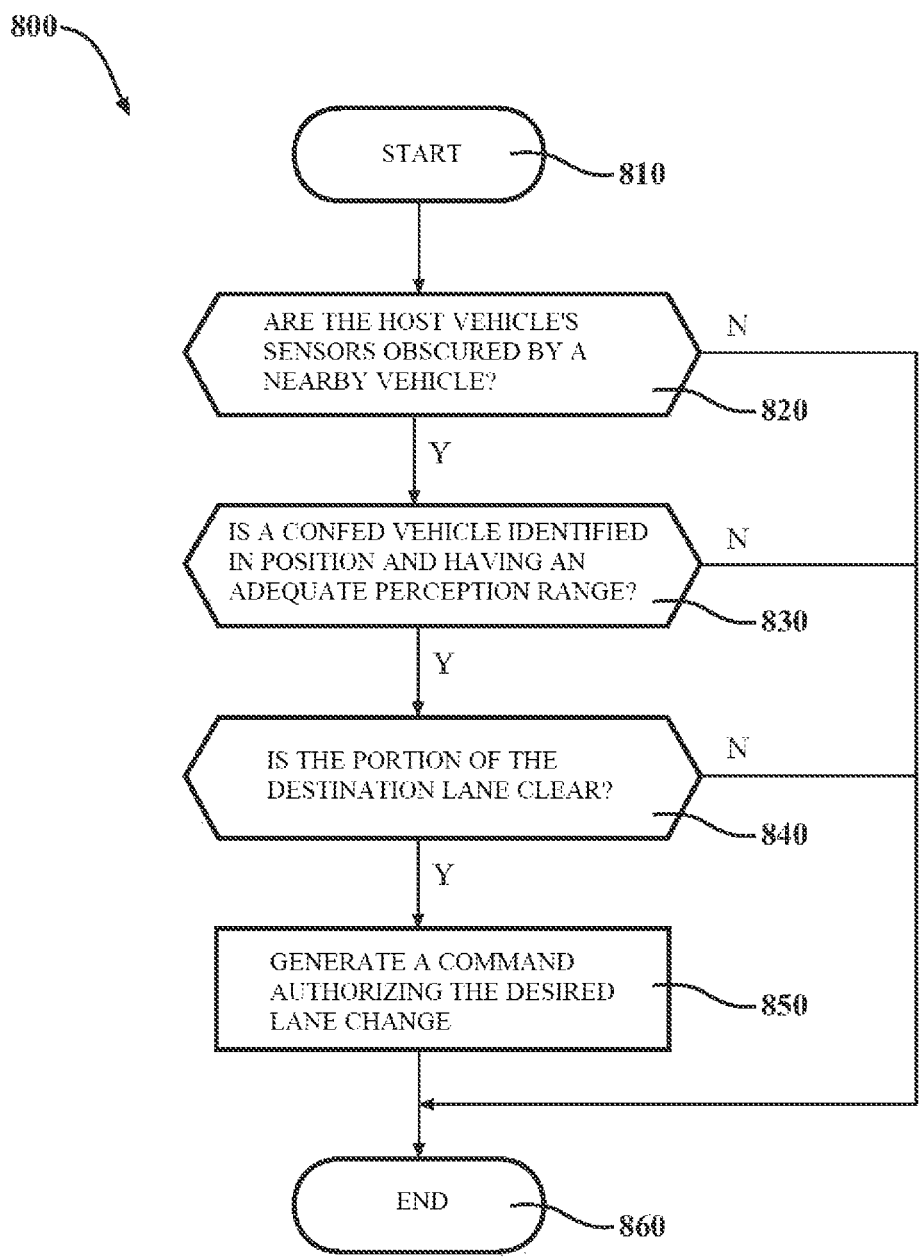
FIG. 12 is a flowchart illustrating an exemplary process operable to execute the desired lane change illustrated in FIG. 11, in accordance with the present disclosure.

FIG. 12 is a flowchart illustrating an exemplary process 800 operable to execute the desired lane change illustrated in FIG. 11. Process 800 starts at step 810, whereat a desired lane change maneuver by a host vehicle 10 into a portion of a destination lane has been identified. At step 820, a determination is made whether sensors of the host vehicle 10 are obscured by a nearby vehicle. If the sensors of the host vehicle 10 are not obscured by a nearby vehicle 22, the process proceeds to step 860, where the process ends and the host vehicle 10 does not initiate the lane change maneuver. It is noted that process 800 is directed specifically to authorizing a lane change in light of a nearby vehicle obscuring a sensor or sensors of the host vehicle 10. In one embodiment, after process 800 ends due to no nearby vehicle 22 obscuring the sensors, the system may subsequently operate process 200 of FIG. 2. If the sensors of the host vehicle 10 are obscured by a nearby vehicle 22, the process advances to step 830. At step 830, a determination is made whether a confederate vehicle 1110 may be identified as being in position and having threshold effective perception range to gather adequate data regarding the portion of the destination lane and further whether the portion of the destination lane is clear. If no confederate vehicle 1110 with threshold effective perception range is identified or if the lane is not clear, the process advances to step 860, where the process ends and the host vehicle 10 does not initiate the lane change maneuver. If a confederate vehicle 1110 with threshold effective perception range is identified and further the portion of the destination lane is determined to be clear, the process advances to step 840. At step 840, a determination is made whether the portion of the destination lane is clear. If the portion of the destination lane is not clear, the process advances to step 860, where the process ends and the host vehicle 10 does not initiate the lane change maneuver. If the portion of the destination lane is clear, the process advances to step 850. At step 850, a command is provided authorizing the desired lane change. At step 860, the process ends. Process 800 is exemplary, a number of additional and/or alternative steps are envisioned, and the disclosure is not intended to be limited to the examples provided herein.

Figure 13:
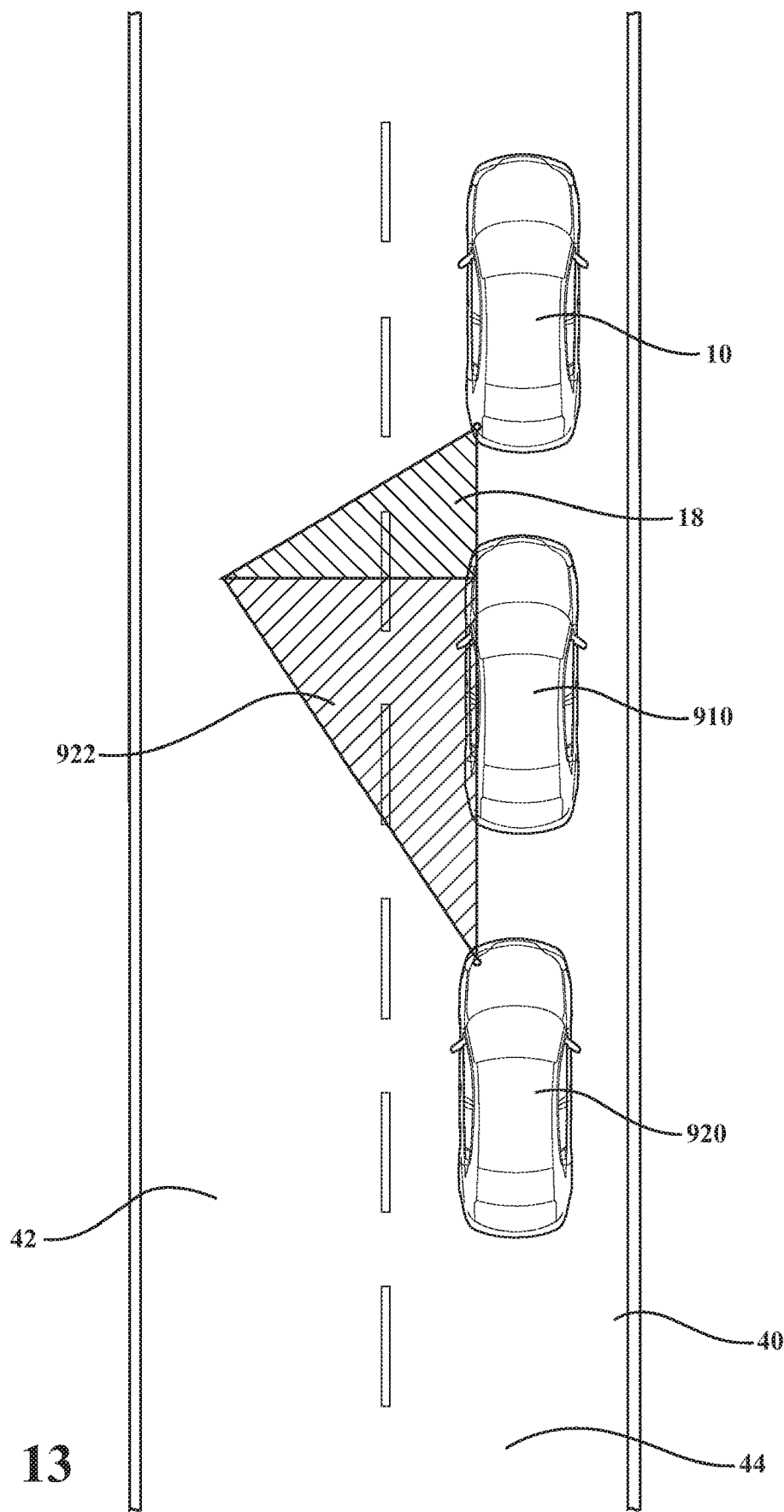
FIG. 13 illustrates an alternative exemplary host vehicle upon a roadway utilizing data from a confederate vehicle to classify a portion of a destination lane as clear for a desired lane change, wherein a third vehicle is situated in a position that partially obscures the sensors of both the host vehicle and the confederate vehicle, in accordance with the present disclosure.

FIG. 13 illustrates an alternative exemplary host vehicle 10 upon a roadway utilizing data from a confederate vehicle 920 to classify a portion of a destination as clear for a desired lane change, wherein a third vehicle 910 is situated in a position that partially obscures the sensors of both the host vehicle and the confederate vehicle. Host vehicle 10 is illustrated upon roadway 40. A third vehicle 910 is located rearward of host vehicle 10. An identified confederate vehicle 920 is located reward of third vehicle 910. Third vehicle 910 is situated in a location that partially obscures sensors of both host vehicle 10 and confederate vehicle 920. Roadway 40 includes a first lane 42 and a second lane 44. Host vehicle 10, either by designation of a user within host vehicle 10 or through autonomous or semi-autonomous computerized methods operated therein or remotely on behalf of host vehicle 10, has identified a desired lane change from second lane 44 to first lane 42. In order for the desired lane change to be authorized, a dynamic controller within host vehicle 10 may analyze available data from sensors monitoring first lane 42 to determine whether a portion of the first lane 42 to the left and rear of host vehicle 10 may be classified as clear. In this example, first lane 42 may be described as the destination lane into which the desired lane change is to occur. The dynamic controller, through use of programmed code and/or use of reference tables may determine 1) a size and geometry of the portion of the destination lane that is to be classified as clear and 2) whether the on-board sensors of the host vehicle are capable of providing data to accomplish classifying the portion of the destination lane as clear. When the on-board sensors are determined to be insufficient or not capable of providing data to accomplish classifying the portion of the destination lane as clear, in accordance with the disclosed process and system, the host vehicle may communicate with another vehicle, in the example of FIG. 11, with confederate vehicle 920. Through the established communication, host vehicle 10 may utilize data from sensors of confederate vehicle 920, in combination with data from on-board sensors of host vehicle 10, to classify the portion of first lane 42 as clear.

In FIG. 13, an exemplary effective perception range 18 of host vehicle 10 is illustrated as shortened in comparison to effective perception range 12 of FIG. 1 due to nearby vehicle 22 obscuring the sensors of host vehicle 10 in FIG. 13. Similarly, the exemplary effective perception range 922 of confederate vehicle 920 is illustrated shortened in comparison to effective perception range 32 of confederate vehicle 30 of FIG. 1. Effective perception range 18 and effective perception range 922 collectively cover a portion of first lane 42 and generate data useful to classify the portion of first lane 42 as clear.

Figure 14:
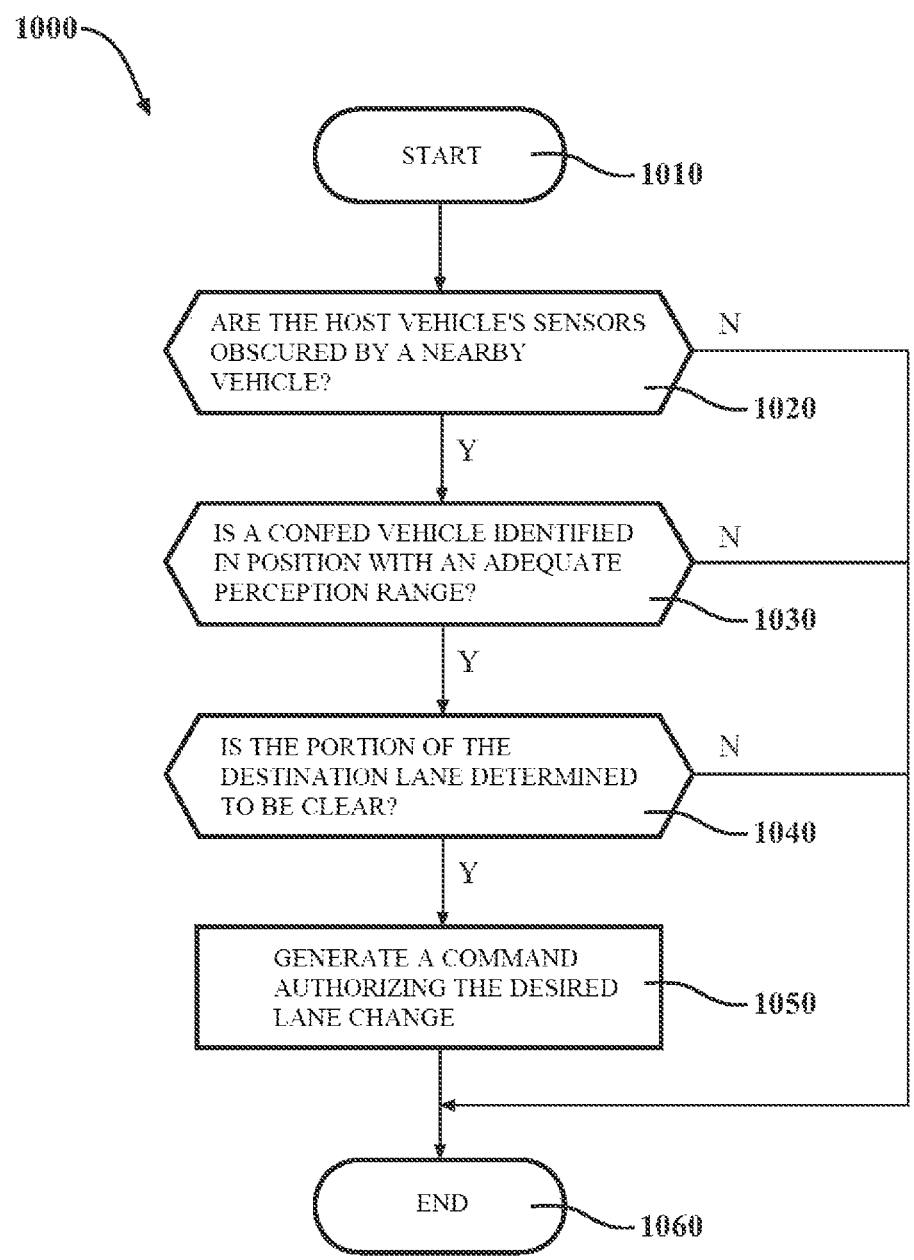
FIG. 14 is a flowchart illustrating an exemplary process operable to execute the desired lane change illustrated in FIG. 13, in accordance with the present disclosure.

FIG. 14 is a flowchart illustrating an exemplary process 1000 operable to execute the desired lane change illustrated in FIG. 13. Process 1000 starts at step 1010, where at a desired lane change maneuver by a host vehicle into a portion of a destination lane has been identified. At step 1020, a determination is made whether sensors of the host vehicle 10 are obscured by a nearby vehicle. If the sensors of the host vehicle are not obscured by a nearby vehicle, the process proceeds to step 1060, where the process ends and the vehicle does not initiate the lane change maneuver. It is noted that process 1000 is directed specifically to authorizing a lane change in light of a nearby vehicle obscuring a sensor or sensors of the host vehicle 10. In one embodiment, after process 1000 ends due to no nearby vehicle obscuring the sensors, the system may subsequently operate process 200 of FIG. 2. If the sensors of the host vehicle 10 are obscured by a nearby vehicle, the process advances to step 1030. At step 1030, a determination is made whether a confederate vehicle 920 may be identified as being in position and having threshold effective perception range to gather adequate data regarding the portion of the destination lane and further whether the portion of the destination lane is clear. If no confederate vehicle 920 with threshold effective perception range is identified or if the lane is not clear, the process advances to step 1060, where the process ends and the host vehicle 10 does not initiate the lane change maneuver. If a confederate vehicle 920 with threshold effective perception range is identified and further the portion of the destination lane is determined to be clear, the process advances to step 1040. At step 1040, a determination is made whether the portion of the destination lane is clear. If the portion of the destination lane is not clear, the process advances to step 1060, where the process ends and the host vehicle 10 does not initiate the lane change maneuver. If the portion of the destination lane is clear, the process advances to step 1050. At step 1050, a command is provided authorizing the desired lane change. At step 1060, the process ends. Process 1000 is exemplary, a number of additional and/or alternative steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A process for sensor sharing for an autonomous lane change, comprising:
   within a dynamic controller of a host vehicle operating in a first lane of travel of a roadway, monitoring sensors of the host vehicle;
   establishing communication between the host vehicle and a confederate vehicle on the roadway;
   monitoring sensors of the confederate vehicle including one of a camera device, a radar device, or a light detection and ranging (LIDAR) device;
   within the dynamic controller of the host vehicle, utilizing a combination of data from the sensors of the host vehicle and data from the sensors of the confederate vehicle to establish absence of an additional vehicle in a second lane of travel next to the host vehicle and initiate a lane change maneuver for the host vehicle based upon the established absence of the additional vehicle; and
   executing the lane change maneuver for the host vehicle.

2. The process of claim 1, wherein establishing the communication between the host vehicle and the confederate vehicle comprises establishing direct vehicle to vehicle communication.

3. The process of claim 1, wherein establishing the communication between the host vehicle and the confederate vehicle comprises communicating through a wireless network.

4. The process of claim 1, wherein utilizing the combination of the data from the sensors of the host vehicle and the data from the sensors of the confederate vehicle to establish absence of the additional vehicle in the second lane of travel next to the host vehicle comprises:
   selecting a calculated perception range to initiate the lane change maneuver; and
   determining whether an effective sensor range of the sensors of the host vehicle and an effective sensor range of the sensors of the confederate vehicle together cover the calculated perception range.

5. The process of claim 4, wherein determining whether the effective sensor range of the sensors of the host vehicle and the effective sensor range of the sensors of the confederate vehicle together cover the calculated perception range comprises determining an effect of a third vehicle obscuring the sensors of the host vehicle by limiting a portion of a field of view of the sensors of the host vehicle.

6. The process of claim 5, wherein determining whether the effective sensor range of the sensors of the host vehicle and the effective sensor range of the sensors of the confederate vehicle together cover the calculated perception range further comprises determining an effect of the third vehicle obscuring the sensors of the confederate vehicle.

7. The process of claim 4, wherein determining whether the effective sensor range of the sensors of the host vehicle and the effective sensor range of the sensors of the confederate vehicle together cover the calculated perception range comprises determining an effect of a trailer being towed by the host vehicle obscuring the sensors of the host vehicle by limiting a portion of a field of view of the sensors of the host vehicle.

8. The process of claim 4, wherein selecting the calculated perception range to initiate the lane change maneuver comprises determining a time to achieve a target speed at a completion of the lane change maneuver.

9. The process of claim 4, wherein selecting the calculated perception range comprises adding an offset value.

10. A process for sensor sharing for an autonomous lane change, comprising:
within a dynamic controller of a host vehicle, monitoring sensors of the host vehicle upon a roadway;
establishing communication between the host vehicle and a confederate vehicle on the roadway;
monitoring sensors of the confederate vehicle;
within the dynamic controller of the host vehicle, utilizing data from the sensors of the host vehicle and data from the sensors of the confederate vehicle to initiate a lane change maneuver for the host vehicle; and
executing the lane change maneuver for the host vehicle;
wherein utilizing the data from the sensors of the host vehicle and the data from the sensors of the confederate vehicle to initiate the lane change maneuver for the host vehicle comprises:
comparing an absolute value of an initial speed of the host vehicle minus a determination lane speed limit plus an offset value to a calibration value; and
declining to initiate the lane change maneuver based upon the comparing.

11. The process of claim 1,
wherein executing the lane change maneuver for the host vehicle comprises moving the host vehicle into the second lane of travel.

12. The process of claim 1, wherein monitoring the sensors of the host vehicle comprises detecting an oversized vehicle upon the roadway;
wherein the host vehicle is initially traveling in the first lane of travel; and
wherein executing the lane change maneuver for the host vehicle comprises moving the host vehicle to one side of the first lane of travel based upon maintaining an offset from the oversized vehicle.

13. The process of claim 12, further comprising determining an effect of a trailer being towed by the host vehicle obscuring the sensors of the host vehicle by limiting a portion of a field of view of the sensors of the host vehicle.

14. The process of claim 1, wherein the confederate vehicle is rearward of the host vehicle.

15. The process of claim 1, wherein the confederate vehicle is forward of the host vehicle.

16. A system for sensor sharing for an autonomous lane change, comprising:
a host vehicle traveling upon a first lane of travel of a roadway and including a first sensor configured to monitor the roadway;
a confederate vehicle traveling upon the roadway including a second sensor configured to monitor the roadway, wherein the second sensor includes one of a camera device, a radar device, or a light detection and ranging (LIDAR) device;
a communication link between the host vehicle and the confederate vehicle; and
a computerized dynamic controller within the host vehicle, programmed to:
monitor data from the first sensor;
monitor data from the second sensor through the communication link;
utilize a combination of the data from the first sensor and the data from the second sensor to establish absence of an additional vehicle in a second lane of travel next to the host vehicle and to initiate a lane change maneuver for the host vehicle based upon the established absence of the additional vehicle; and
authorize the lane change maneuver for the host vehicle.

17. The system of claim 16, wherein the host vehicle comprises a towed trailer; and
wherein the computerized dynamic controller evaluates an effect of the towed trailer upon the data from the first sensor.

18. The system of claim 16, wherein the dynamic controller programmed to utilize the combination of the data from the first sensor and the data from the second sensor to initiate the lane change maneuver for the host vehicle comprises:
selecting a calculated perception range to initiate the lane change maneuver; and
determining whether an effective sensor range of the sensors of the host vehicle and an effective sensor range of the sensors of the confederate vehicle together cover the calculated perception range.

* * * * *